M. E. LAYNE.
ROLLER BEARING FOR SHAFTS.
APPLICATION FILED FEB. 7, 1910.

1,009,322.

Patented Nov. 21, 1911.

2 SHEETS—SHEET 1.

WITNESSES
Jesse Bowling
L. E. Noack

INVENTOR
Mahlon E. Layne.
BY Schley Davis
ATTORNEYS

M. E. LAYNE.
ROLLER BEARING FOR SHAFTS.
APPLICATION FILED FEB. 7, 1910.

1,009,322.

Patented Nov. 21, 1911.
2 SHEETS—SHEET 2.

WITNESSES:
Jesse Bowling
L. E. Noack.

INVENTOR
Mahlon E. Layne
BY Schley Davis
ATTORNEYS

őd
UNITED STATES PATENT OFFICE.

MAHLON E. LAYNE, OF HOUSTON, TEXAS.

ROLLER-BEARING FOR SHAFTS.

1,009,322.

Specification of Letters Patent. Patented Nov. 21, 1911.

Application filed February 7, 1910. Serial No. 542,411.

*To all whom it may concern:*

Be it known that I, MAHLON E. LAYNE, a citizen of the United States, residing at Houston, in the county of Harris and State of Texas, have invented certain new and useful Improvements in Roller-Bearings for Shafts, of which the following is a specification.

This invention has relation to roller bearings.

The object of the invention is to provide a construction whereby the thrust is in an outward direction.

Another feature resides in a large wearing surface and the obviation of friction.

A further point of novelty lies in the arrangement by which the rollers are positioned on shafts supported at their outer ends instead of their inner end, whereby the rollers may be assembled in close relation to the shaft and more compact bearing produced.

A still further object is the connection of the rollers with a member rotating in the same direction as the shaft, whereby friction between the member and the shaft is reduced to a minimum; and further whereby the rollers being connected to a common part are caused to follow in equal relation and in proper time.

Among other features are the provision of a swivel support for the shaft and bearing, whereby the alinement of the shaft is preserved; an oil bath lubrication; and a general simplicity and practical arrangement of parts whereby access may be readily had.

Finally the object of the invention is to provide a device of the character described that will be strong, durable, efficient and simple and comparatively inexpensive to construct; also one in which the several parts will not be likely to get out of working order.

Figure 1:
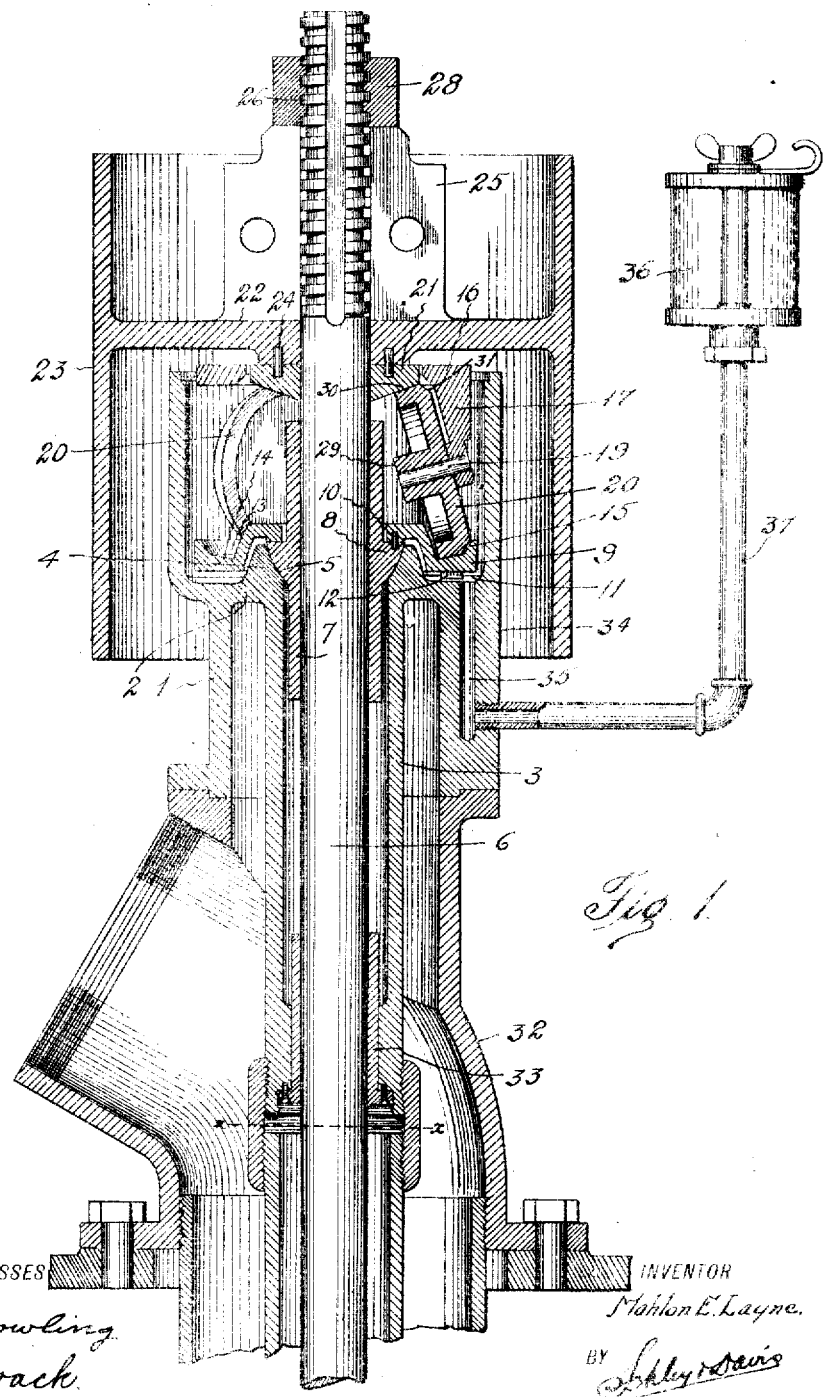
Figure 2:
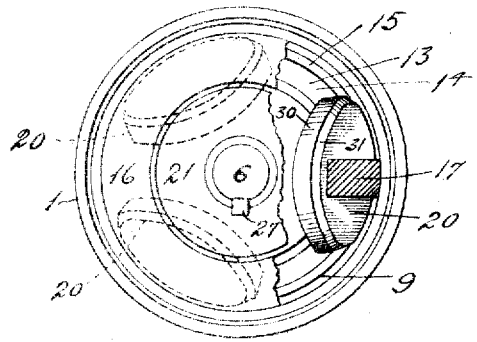
Figure 3:
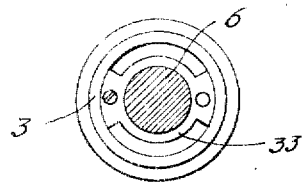
Figure 4:
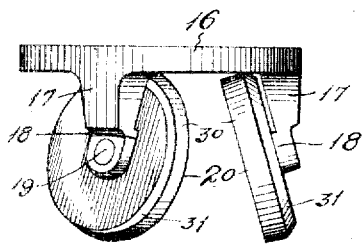

With the above and other objects in view, the invention has relation to certain novel features of construction and operation, an example of which is described in the following specification and illustrated in the accompanying drawings, wherein:

Figure 1 is a vertical sectional view showing the bearing connected with a pump head. Fig. 2 is a plan view with the pulley removed and a part broken away to show underlying parts. Fig. 3 is a horizontal cross-sectional view taken on the line *x—x* of Fig. 1 and looking in the direction of the arrow, and Fig. 4 is an elevation of the bearing cage and rollers removed from the housing.

In the drawings, the numeral 1 designates a cylindrical housing or head construction provided with an internal annular flange or web, 2, from the center of which a sleeve 3 depends. Above the flange 2 the housing is slightly enlarged to receive the bearing and constitutes an oil reservoir. At its central portion and concentric to the sleeve, the flange is provided with a spherical socket 4, having a seat 5, terminating at its bottom in the upper end of the sleeve. A vertical drive shaft 6, somewhat less in diameter than the sleeve, passes therethrough, leaving a sufficient space to receive loosely, a vertical bushing 7, which has a limited play laterally. The bushing extends above and below the socket and is provided intermediate its ends with a boss 8, having the same partially spherical contour as the seat 5.

It is to be understood that the drive shaft has no play in the bushing but merely a turning fit. It is obvious that the boss 8 and seat 5 provide substantially a ball and socket joint, the purpose of which will be hereinafter set forth.

On the boss 8 which projects slightly above the socket, an annular race plate 9 surrounding the bushing is held in fixed relation thereto by a locking pin 10. The race plate overhangs the socket and has its under surface in close proximity to the flange 2 on which one or more radial ribs 11 are formed and engaged by a lug 12, depending from the plate, whereby the latter and also the bushing are held against rotation.

The race plate 9 in its overhanging portion is provided with an annular race 13 comprising a track 14 inclined downward toward the center of the plate, and along the outer edge of the track, an upstanding beveled guard wall 15. A spacer ring 16 is disposed in the upper portion of the housing and provided with a plurality of depending arms 17, equally spaced and provided with bearing bosses 18 on inner sides of their lower ends. From each boss 18, a stud 19 projects radially inward toward the bushing 7, but does not contact or have any connection therewith. Each stud has a screw threaded portion engaging in the arm and may be readily removed, the same as an ordinary screw. On each stud, a bearing roller 20 is loosely mounted, the stud being disposed at such an angle as to hold the roller inclined inward and comparatively close at its upper end to the drive shaft. I wish to call attention at this point to the fact that there are no studs, axles, collars or cages either about the drive shaft or between the latter and the rollers, these latter being held from their outer sides, whereby a compact disposition of the rollers is had and they may be clustered more closely about the shaft.

Within the spacer ring and loosely encircling the drive shaft 6, a bearing ring 21 is provided. This bearing ring has its under surface inclined down toward its center and provides a face or track bearing on the rollers. The bearing ring receives the underside of the web 22 of a pulley 23 disposed horizontally and surmounting the upper portion of the housing. The web and ring 21 are locked together by pins 24 whereby the pulley rotates the ring. Above the web the pulley has a split hub 25 screw threaded to engage the upper screw threaded end portion 26 of the drive shaft 6. This screw threaded portion passes loosely through the hub, that is, it does not have screw threaded engagement therewith; while above the hub a nut 28 engages the shaft and rests on the hub. The hub and portion 26 are provided with vertical key seats adapted to receive a key 27 terminating below the nut and acting to secure the pulley to the shaft. It is obvious that by adjusting the nut 28, the shaft may be raised and lowered as may be desired.

It is apparent that the drive shaft is driven by the pulley, which also rotates the bearing ring. It is further to be noted that the spacer ring 16 is independent and free to rotate in the direction of rotation of the drive shaft. I wish to call attention to the construction of the bearing rollers 20, each of which is cored out and provided with a long inwardly extending hub 29 receiving the stud 19. The hubs are not confined on the studs by a fastening and in this way the use of nuts, washers and spacing collars obviated. Each roller has a broad flat face 30 freely fitting the track 14 while its outer edge is beveled at 31 to coöperate with the wall 15, but normally not contacting with said wall, which acts only as a guard to retain the rollers in the race.

One of the novel features of this invention is the truncated cone shape of the rollers whereby the face 30 of each tapers inward and the track 14, and the under face of its bearing ring 21 are correspondingly inclined, but not parallel. The taper of the rollers is very slight and has been exaggerated in the drawings. However, sufficient taper is made to cause an outward thrust and give a more even wear.

Going back in the description, it will be seen that the race plate 9 is supported by the bushing 7. The race plate supports the rollers which support the ring 21, which in turn supports the pulley by its web 22. The shaft 6 is supported on the pulley by the nut 28. Consequently the bushing 7 is the real supporting member on which all of the said parts are carried and the bushing being in turn supported by its boss 8 in the seat 5 and a ball and socket joint formed. By reason of this ball and socket joint, the bearing parts are prevented from binding upon each other in case the shaft is sprung out of line as would be the case if an undue lateral strain was placed on the pulley 23.

While the bearing may be used in various manners, I have shown the housing 1 mounted on a pump head 32. At the lower end of the depending sleeve 2 a bushing 33 is suitably secured to receive the drive shaft 6.

Another feature I desire to accentuate is the lubrication of the bearing whereby the liability of "heating" is reduced to a minimum. At one side of the lower portion of the housing 1 an enlargement 34 is provided and formed with a vertical passage 35 terminating at its upper end under the race plate 9. Oil is supplied from a cup 36 above the bearing to the passage by a pipe 37 threaded into the enlargement at the lower end. The oil escaping from the passage 35 flows into the housing, surrounding the race plate 9, filling the race 13 and submerging the rollers 20 to a point above the studs 19. The rollers will thus carry up the oil, lubricate the bearing ring 21 and other parts. From this it will be seen that the bearing operates in a bath of oil, which may be regulated from the cup 36.

It is to be understood that the pulley 23 may be secured on the shaft at various points and the shaft may be used either in position, vertical, horizontal, or at an angle.

What I claim is:

1. In a roller bearing, a housing having a seat, a sleeve provided with a boss resting in the seat of the housing, a bearing member surrounding the sleeve and resting on the boss, the bearing member having a downwardly extending portion surrounding the seat portion of the housing and provided with an inclined track, a shaft passing through the sleeve, a second bearing member surrounding the shaft above the first bearing member, and bearing rollers interposed between the bearing members.

2. In a roller bearing for shafts, a housing, a shaft extending through the housing, a separate track member having an annular track surrounding the shaft, bearing rollers traveling on the track, a spacing device free in the housing and connected to the rollers whereby the same are held equidistant, and a bearing member resting on the rollers and surrounding the shaft, the bearing member fitting in and surrounded by a spacing device.

3. In a roller bearing, a housing provided with an elongated depending sleeve, the housing having a socket at the upper end of the sleeve, a bushing having a boss engaging in the socket, the bushing having a portion smaller in diameter than the internal diameter of the sleeve and extending thereinto, a bearing member supported on the boss of the bushing and provided with a track surrounding the socket, a shaft extending through the sleeve and the bushing, a pulley secured on the shaft and having its peripheral wall surrounding the housing, a bearing disk surrounding the shaft, inclined bearing rollers engaging between the track of the bearing member and the bearing disk, and a spacing device having connection with and surrounding the rollers.

4. In a roller bearing, a housing having a central opening surrounded by a seat, a sleeve extending through the opening of the housing and extending thereinto, a boss provided on the sleeve and engaging the seat of the housing, a bearing member surrounding the sleeve and having an inclined track near its outer periphery, the central portion of the bearing member resting on and extending over the boss, a second bearing member surrounding the shaft, inclined bearing rollers engaging on the track of the first bearing member and supporting the second bearing member, and a spacing device engaging with the rollers.

In testimony whereof I have signed my name to this specification in the presence of two subscribing witnesses.

MAHLON E. LAYNE.

Witnesses:
JACK A. SCHLEY,
CHAS. B. MANN.